(12) United States Patent
Kojima et al.

(10) Patent No.: US 12,163,540 B2
(45) Date of Patent: Dec. 10, 2024

(54) FLUID DEVICE

(71) Applicant: SEIKO EPSON CORPORATION, Tokyo (JP)

(72) Inventors: Chikara Kojima, Matsumoto (JP); Tomohide Onogi, Shiojiri (JP); Kanechika Kiyose, Matsumoto (JP); Mitsuru Miyasaka, Suwa (JP); Mio Sasaki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 655 days.

(21) Appl. No.: 17/387,367

(22) Filed: Jul. 28, 2021

(65) Prior Publication Data

US 2022/0034782 A1 Feb. 3, 2022

(30) Foreign Application Priority Data

Jul. 29, 2020 (JP) ................. 2020-128002

(51) Int. Cl.
*F15D 1/00* (2006.01)
*G01N 15/1404* (2024.01)

(52) U.S. Cl.
CPC ....... *F15D 1/007* (2013.01); *G01N 2015/142* (2013.01)

(58) Field of Classification Search
CPC ............. F15D 1/007; G01N 15/1404; G01N 2015/1415; G01N 2015/142
See application file for complete search history.

(56) References Cited

U.S. PATENT DOCUMENTS 5,892,143 A * 4/1999 Namerikawa ........... G01L 9/008
73/54.27

FOREIGN PATENT DOCUMENTS

| JP | H09210999 B | 7/2003 |
| JP | 2007237475 A | 9/2007 |
| JP | 2014104664 A | 6/2014 |

OTHER PUBLICATIONS

Office Action for JP Patent Application No. JP2020128002, issued on Jan. 31, 2024, 8 pages of Office Action.
Ota N, Yalikun Y, Suzuki T, Lee SW, Hosokawa Y, Goda K, Tanaka Y. 2019 Enhancement in acoustic focusing of micro and nanoparticles by thinning a microfluidic device. R. Soc. open sci. 6: 181776.

* cited by examiner

*Primary Examiner* — Bradley R Spies
(74) *Attorney, Agent, or Firm* — CHIP LAW GROUP

(57) ABSTRACT

A fluid device includes: a flow path through which a fluid flows; and an ultrasonic wave transmitter configured to transmit an ultrasonic wave to generate a standing wave to the fluid in the flow path along a first direction orthogonal to a flowing direction of the fluid. The ultrasonic wave transmitter is in contact with the fluid and faces an antinode region corresponding to any antinode in the standing wave.

17 Claims, 10 Drawing Sheets

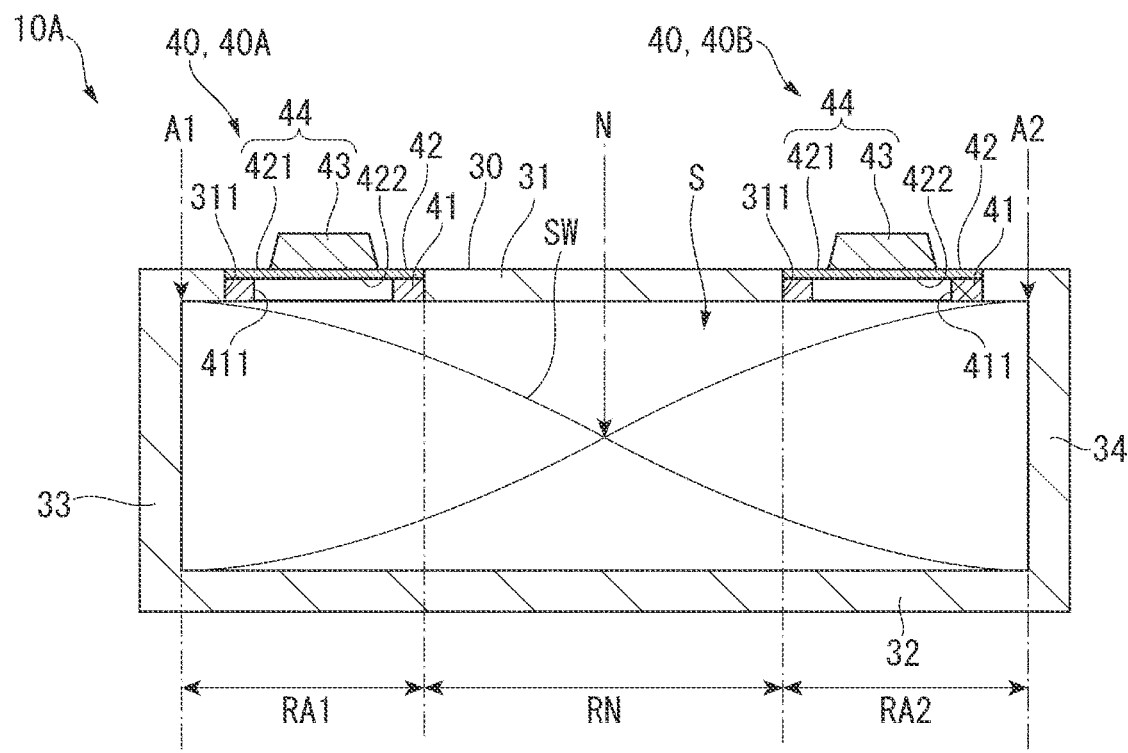
FIG. 3
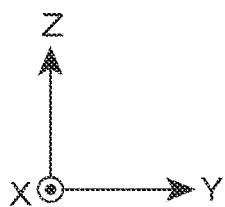

FLUID DEVICE

The present application is based on, and claims priority from JP Application Serial Number 2020-128002, filed Jul. 29, 2020, the disclosure of which is hereby incorporated by reference herein in its entirety.

BACKGROUND

1. Technical Field

The present disclosure relates to a fluid device.

2. Related Art

In related art, a fluid device that performs acoustic convergence on fine particles in a fluid is known.

For example, a fluid device disclosed in "Enhancement in acoustic focusing of micro and nanoparticles by thinning a microfluidic device", Nobutoshi Ota, 6 others, December 2019, Royal Society Open Science, Volume 6, Issue 2, Article No. 181776 includes a flow path substrate (glass substrate) in which a flow path is formed, and a piezoelectric element provided at the flow path substrate. An ultrasonic wave generated by the piezoelectric element is transmitted to an inside of the flow path via the flow path substrate, and generates a standing wave in a fluid in the flow path. Fine particles in the fluid converge in a predetermined range in the flow path due to a pressure gradient of the fluid formed by the standing wave.

However, in the fluid device disclosed in "Enhancement in acoustic focusing of micro and nanoparticles by thinning a microfluidic device", since a difference between an acoustic impedance of the fluid and an acoustic impedance of the flow path substrate is large, when the ultrasonic wave generated by the piezoelectric element is propagated from the flow path substrate to the fluid, most of the ultrasonic waves are reflected at a boundary between the flow path substrate and the fluid. Therefore, generation efficiency of the standing wave in the flow path is lowered, and as a result, a drive voltage and a driving frequency that are applied to the piezoelectric element for generating the standing wave increase.

SUMMARY

A fluid device according to an aspect of the present disclosure includes: a flow path through which a fluid flows; and a first ultrasonic wave transmitter configured to transmit an ultrasonic wave to the fluid to generate a standing wave to the fluid in the flow path along a first direction orthogonal to a flowing direction of the fluid. The first ultrasonic wave transmitter is in contact with the fluid and faces a first antinode region corresponding to any first antinode in the standing wave.

BRIEF DESCRIPTION OF THE DRAWINGS

FIG. 3 is a cross-sectional view schematically showing a part of a fluid device according to a second embodiment.

DESCRIPTION OF EXEMPLARY EMBODIMENTS

First Embodiment

Hereinafter, a fluid device 10 according to a first embodiment will be described with reference to FIGS. 1 and 2.

Figure 1:
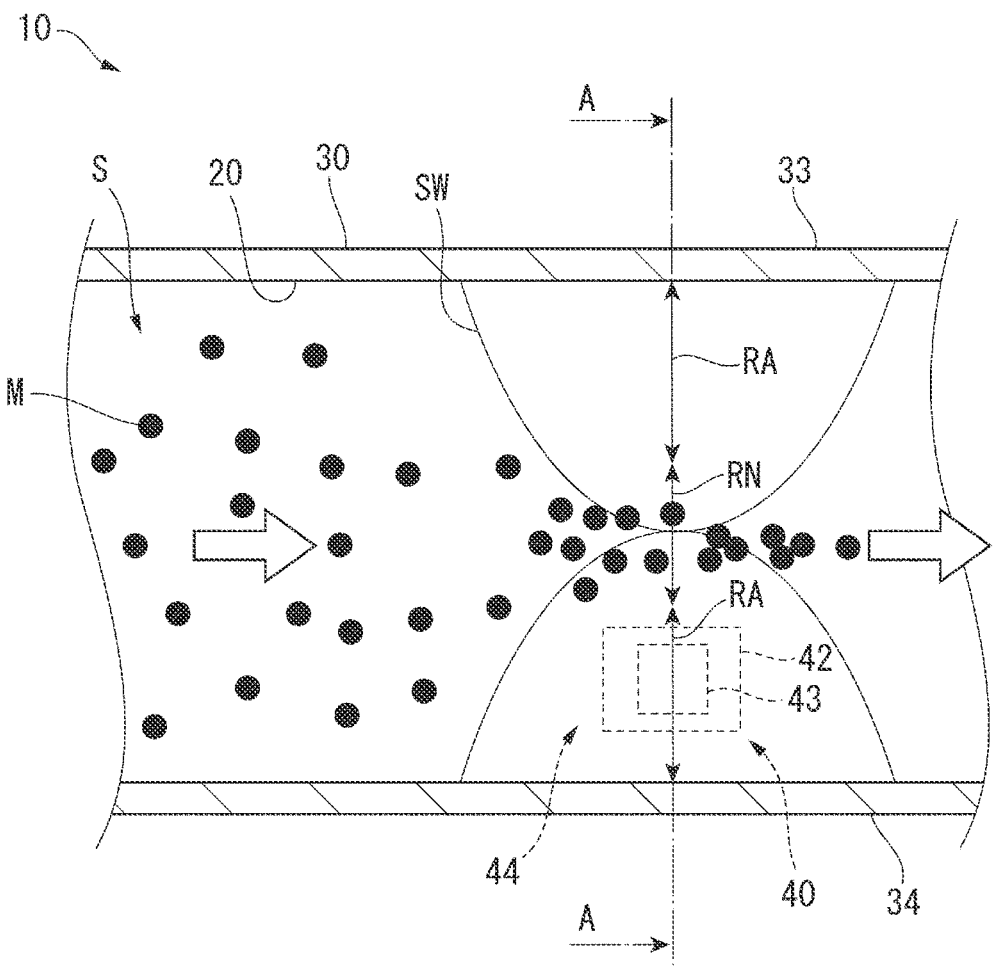
FIG. 1 is a cross-sectional view schematically showing a part of a fluid device according to a first embodiment.
Figure 2:
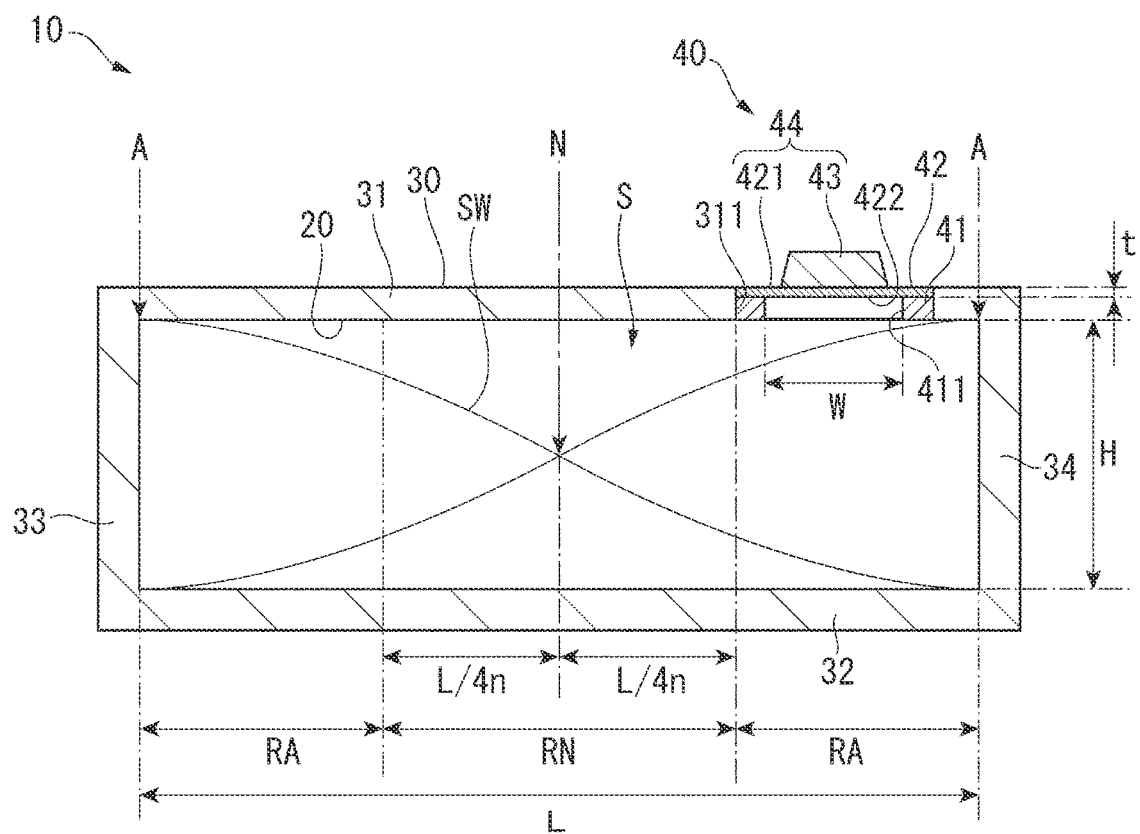
FIG. 2 is a cross-sectional view taken along a line A-A in FIG. 1.

FIG. 1 is a cross-sectional view schematically showing a part of the fluid device 10 according to the first embodiment, and FIG. 2 is a cross-sectional view taken along a line A-A in FIG. 1.

The fluid device 10 includes a flow path substrate 30 in which a flow path 20 is formed, and an ultrasonic wave transmitter 40 provided at the flow path substrate 30.

In the fluid device 10, the ultrasonic wave transmitter 40 applies ultrasonic waves to a fluid S flowing through the flow path 20, thereby generating a standing wave SW with any mode order along a first direction orthogonal to a flowing direction of the fluid S. In a process of fine particles M dispersed in the fluid S flowing through the flow path 20, the fine particles M are affected by a pressure gradient formed by the standing wave SW, and are converged in a predetermined range in the flow path 20.

In such a fluid device 10, for example, a concentration of the fine particles M in the fluid S can be increased by providing, in the flow path 20, a concentration flow path through which the fluid S in the predetermined range selectively flows and a discharge flow path through which the fluid S in a range other than the predetermined range selectively flows. In the predetermined range, the fine particles M are converged.

In FIG. 1, a state of the fine particles M converged by the standing wave SW of a first-order mode is schematically illustrated. In FIG. 2, illustration of the fine particles M is omitted, and the standing wave SW generated in the flow path 20 is shown as a pressure waveform.

Configuration of Fluid Device 10

A schematic configuration of the fluid device 10 will be described with reference to FIG. 2.

The flow path substrate 30 is a substrate in which the flow path 20 is formed. The flow path substrate 30 can be formed, for example, by joining a pair of substrates having groove portions corresponding to the flow path 20 to each other. The substrates constituting the flow path substrate 30 are not particularly limited, and for example, a glass substrate or a silicon substrate can be used.

Although not shown, the flow path substrate 30 is formed with an injection port for injecting the fluid S into the flow path 20 and one or more discharge ports for discharging the fluid S from the flow path 20. When the flow path 20 is coupled to each of the concentration flow path and the discharge flow path as described above, each of these flow paths is formed with the discharge port.

In the present embodiment, a cross section of the flow path 20 formed in the flow path substrate 30 is rectangular, and a depth direction of the flow path 20 coincides with a thickness direction of the flow path substrate 30. The flowing direction of the fluid S flowing through the flow path 20 is orthogonal to the depth direction of the flow path 20, and a width direction of the flow path 20 is orthogonal to each of the depth direction of the flow path 20 and the flowing direction of the fluid S.

Hereinafter, the flowing direction of the fluid S is referred to as an X direction, the width direction of the flow path 20 is referred to as a Y direction, and the depth direction of the flow path 20 is referred to as a Z direction. The X, Y, Z directions are orthogonal to one another.

The flow path substrate 30 includes an upper wall portion 31 constituting a wall portion of the flow path 20 on one side in the Z direction, a lower wall portion 32 constituting a wall portion of the flow path 20 on the other side in the Z direction, and side wall portions 33, 34 constituting wall portions of the flow path 20 on both sides in the Y direction.

The flow path substrate 30 is formed with a through hole 311 penetrating the upper wall portion 31 in the Z direction.

The ultrasonic wave transmitter 40 is provided at the flow path substrate 30 so as to close the through hole 311 of the flow path substrate 30. Accordingly, the ultrasonic wave transmitter 40 forms a part of the wall portion of the flow path 20.

Specifically, the ultrasonic wave transmitter 40 includes an element substrate 41, a vibration film 42 supported by the element substrate 41, and a piezoelectric element 43 provided at the vibration film 42.

The element substrate 41 is a semiconductor substrate made of Si or the like. The element substrate 41 is disposed in the through hole 311 of the flow path substrate 30 such that a thickness direction of the element substrate 41 is along the Z direction, and an outer peripheral surface of the element substrate 41 is in liquid-tight contact with an inner peripheral surface of the through hole 311 of the flow path substrate 30.

The element substrate 41 is formed with an opening portion 411 penetrating the element substrate 41 along the thickness direction of the element substrate 41.

The vibration film 42 is formed of a laminated body or the like, in which a plurality of types of films are laminated, such as a $SiO_2$ film and a $ZrO_2$ film. The vibration film 42 is supported by the element substrate 41, and closes one side (an opposite side of the opening portion 411 from a flow path 20 side) of the opening portion 411.

A portion of the vibration film 42 that overlaps the opening portion 411 when viewed from the thickness direction of the element substrate 41 constitutes a vibrator 421 that transmits ultrasonic waves. One surface of a pair of surfaces of the vibrator 421 serves as a fluid contact surface 422 that is to be in contact with the fluid S flowing into the opening portion 411 from the flow path 20.

Here, the vibration film 42 is disposed such that the thickness direction (a normal direction of the fluid contact surface 422) of the vibration film 42 is along the Z direction.

The piezoelectric element 43 is provided at an opposite-side surface of the vibrator 421 from the fluid contact surface 422. Although not shown, the piezoelectric element 43 is formed by sequentially laminating a lower electrode, a piezoelectric film, and an upper electrode on the vibrator 421.

In such an ultrasonic wave transmitter 40, an ultrasonic element 44 includes the vibrator 421 and the piezoelectric element 43 disposed on the vibrator 421.

In the ultrasonic element 44, the piezoelectric element 43 is coupled to a drive unit (not shown). When a drive signal is input to the piezoelectric element 43 from the drive unit, a voltage is applied between the lower electrode and the upper electrode, and the piezoelectric film expands and contracts. Accordingly, the vibrator 421 vibrates with flexural vibration in the normal direction of the fluid contact surface 422 at a predetermined oscillation frequency corresponding to a dimension W (an opening width of the opening portion 411) of the vibrator 421 in a short-side direction or the like. The flexural vibration of the vibrator 421 is converted into a compressional wave of the fluid S to propagate the ultrasonic waves. The ultrasonic waves propagated to the fluid S are radially diffused around the vibrator 421, and the ultrasonic waves traveling in the Y direction are repeatedly reflected by inner walls of the flow path 20, thereby generating the standing waves SW in the flow path 20.

Here, in order to generate the standing wave SW in the Y direction in the flow path 20, a flow path width L, which is a dimension of the flow path 20 in the Y direction, satisfies the following expression (1).

$$L = \frac{n \times C}{2F} \quad (1)$$

Here, n is the mode order of the standing wave SW, C is a sound velocity [m/s] of a medium of the fluid S, and F is a driving frequency [Hz] of the piezoelectric element 43. The driving frequency F corresponds to the above-described oscillation frequency of the vibrator 421.

According to the above expression (1), it is assumed that when the sound velocity C of the medium is 1500 m/s when the medium is water, the mode order n of the standing wave SW is 1, and the driving frequency F of the piezoelectric element 43 is 600 kHz, the flow path width L is set to 1.25 mm.

In order to prevent generation of a standing wave in the Z direction in the flow path 20, a flow path depth H [m], which is a dimension of the flow path 20 in the Z direction, satisfies the following expression (2).

$$H < \frac{C}{2F} \quad (2)$$

According to the above expression (2), the flow path depth H is smaller than the flow path width L when the mode order n of the standing wave SW calculated by the above expression (1) is 1. That is, according to the above expressions (1), (2), the flow path 20 is formed such that the flow path depth H is smaller than the flow path width L.

Alternatively, in order to prevent the generation of the standing wave in the Z direction in the flow path 20, the flow path depth H may be set to be significantly larger than the flow path width L set by the above expression (1) without satisfying the above expression (2). In this case, a standing wave of a higher-order mode may be generated in the Z direction. However, such a standing wave of the higher-order mode has an acoustic power smaller than that of the standing wave SW generated in the Y direction, and thus an influence of the standing wave of the higher-order mode can be ignored.

Thickness of Vibrator 421

When the piezoelectric element 43 is driven, not only a transverse wave that causes the flexural vibration of the vibrator 421, but also a longitudinal wave that propagates inside the vibrator 421 is generated.

When a thickness t of the vibrator 421 is larger than a wavelength λ of the longitudinal wave, the longitudinal wave becomes dominant in the vibrator 421, and propagation efficiency of the ultrasonic wave from the vibrator 421 to the fluid S decreases. That is, this is equivalent to a state in which matching of acoustic impedances is not achieved.

Even when the thickness t of the vibrator 421 is smaller than the wavelength λ of the longitudinal wave, the longitudinal wave is slightly generated in the vibration film 42. In particular, when the thickness t of the vibrator 421 is equal to λ/4, the vibrator 421 functions as an acoustic matching layer of the longitudinal wave, and the longitudinal wave generated in the vibrator 421 is easily propagated to the fluid S. However, in a case of acoustic emission using the longitudinal wave, the propagation efficiency of the ultrasonic wave from the vibrator 421 to the fluid S is reduced as compared with a case of acoustic emission using the transverse wave.

Therefore, in the present embodiment, the vibrator 421 is formed such that the thickness t is smaller than ¼ of the wavelength λ of the longitudinal wave. That is, the thickness t [m] of the vibrator 421 satisfies the following expression (3).

$$t < \frac{\lambda}{4} \tag{3}$$

The thickness t [m] of the vibrator 421 is a dimension of the vibrator 421 along the normal direction with respect to the fluid contact surface 422, and corresponds to a film thickness of the vibration film 42.

The wavelength λ of the longitudinal wave in the above expression (3) is expressed by the following expression (4).

$$\lambda = \frac{C'}{F} \tag{4}$$

In the above expression (4), C' is an average sound velocity [m/sec] of the longitudinal wave generated in the vibrator 421, and F is the driving frequency [Hz] of the piezoelectric element 43.

According to the above expression (4), the above expression (3) is expressed by the following expression (5).

$$t < \frac{C'}{4F} \tag{5}$$

The driving frequency F in the above expression (5) satisfies the following expression (1) as described above.

$$L = \frac{n \times C}{2F} \tag{1}$$

In the above expression (1), L is the flow path width [m], n is the mode order of the standing wave SW, C is the sound velocity [m/s] of the medium of the fluid S, and F is the driving frequency [Hz] of the piezoelectric element 43.

According to the above expressions (1), (5), the thickness t of the vibrator 421 satisfies the following expression (6).

$$t < \frac{C'}{C} \times \frac{L}{2n} \tag{6}$$

The vibration film 42 according to the present embodiment is a laminated body of a plurality of films. That is, the vibrator 421 according to the present embodiment is constituted by a plurality of films. In this case, the average sound velocity C' of the longitudinal wave generated in the vibrator 421 is calculated according to the following method.

Here, when the number of films constituting the vibrator 421 is m, a thickness of each film constituting the vibrator 421 is $t_k$ (k=1, 2, ... m), and an average of the longitudinal wave sound velocities in each film constituting the vibrator 421 is $C_k$ (k=1, 2, ... m), the following expression (7) is established.

$$\frac{t}{C'} = \sum_{k=1}^{m} \frac{t_k}{C_k} \tag{7}$$

The thickness t of the vibrator 421 is expressed by the following expression (8).

$$t = \sum_{k=1}^{m} t_k \tag{8}$$

Therefore, according to the above expressions (7), (8), the average sound velocity C' of the longitudinal wave generated in the vibrator 421 is expressed by the following expression (9).

$$C' = \frac{\sum_{k=1}^{m} t_k}{\sum_{k=1}^{m} \frac{t_k}{C_k}} \tag{9}$$

From a viewpoint of improving the propagation efficiency of the ultrasonic wave from the vibrator 421 to the fluid S, it is desirable that the thickness t of the vibrator 421 be a smaller value while satisfying the above expression (6).

However, when the thickness t of the vibrator 421 becomes too small, a stress gradient in the thickness direction of the vibrator 421 becomes large, and thus, when the piezoelectric element 43 is driven, there is a high chance that the vibrator 421 is damaged.

Therefore, in the present embodiment, as a result of an experiment in which the piezoelectric element 43 is driven by changing the dimension W of the vibrator 421 in the short-side direction and the thickness t of the vibrator 421, it is preferable that the thickness t of the vibrator 421 satisfies the following expression (10).

$$8.03 \times 10^{-3} \times W \times E'^{-\frac{1}{3}} \times \left(\frac{n}{2} \times \frac{C}{L}\right) \leq t \tag{10}$$

In the above expression (10), W is the dimension [m] of the vibrator 421 in the short-side direction, E' is an average Young's modulus [Pa] of the vibrator 421 when a Poisson's ratio is 0.3, n is the mode order of the standing wave SW, and C is the sound velocity [m/sec] of the medium of the fluid S. When the thickness t of the vibrator 421 is smaller than a thickness obtained by a left side of the above expression (10), there is a high chance that the vibrator 421 is damaged.

As described above, the vibrator 421 according to the present embodiment is constituted by a plurality of (m) films. In this case, the average Young's modulus E' of the vibrator 421 can be expressed by the following expression (11).

$$E' = \frac{4}{d_m^m} \sum_{i=1}^{i} E_i \{(d_i - \alpha)^m - (d_{i-1} - \alpha)^m\} \quad (11)$$

α in the above expression (11) is defined by the following expression (12).

$$\alpha = \sum_{i=1}^{m} \frac{E_i(d_i^2 - d_{i-1}^2)}{2E_i(d_i - d_{i-1})} \quad (12)$$

In the above expressions (11), (12), m is the number of films constituting the vibrator 421, and $E_i$ (i=1, 2, ... m) is the Young's modulus of each film constituting the vibrator 421 when the Poisson's ratio is 0.3.

$d_i$ is expressed by the following expression (13).

$$d_i = \Sigma_{k=1}^{i} t_k \quad (13)$$

In the above expression (13), $t_k$ (k=1, 2, ... m) is the thickness of each film constituting the vibrator 421. That is, $d_i$ is a value obtained by adding the thicknesses $t_k$ of the films constituting the vibrator 421 up to an i-th thickness.

Here, when the fluid device 10 according to the present embodiment has the following configuration, it is preferable that the thickness t of the vibrator 421 falls within a range of the following expression (14) using the expression (6) and the expression (10) described above.

Dimension W of vibrator in short-side direction: 19 μm
Flow path width L: 375 μm
Sound velocity C of medium of fluid S: 1500 m/s
Mode order n of standing wave SW: 1
Vibration film 42: two-layer structure of $SiO_2$ film and $ZrO_2$ film
Film thickness t1 of $SiO_2$ film: 0.35 μm
Film thickness t2 of $ZrO_2$ film: 0.15 μm
Young's modulus $E_1$ of $SiO_2$: 75 GPa
Young's modulus $E_2$ of $ZrO_2$: 190 GPa
Sound velocity $C_1$ of $SiO_2$: 5900 m/s
Sound velocity $C_2$ of $ZrO_2$: 4650 m/s $$0.5 \times 10^{-6} (m) \leq t < 685 \times 10^{-6} (m) \quad (14)$$

Configuration of Ultrasonic Element 44

When the standing wave SW in the Y direction is generated inside the flow path 20, an antinode A at which an acoustic pressure becomes maximum and a node N at which the acoustic pressure becomes 0 periodically appear along the Y direction. In the present embodiment, the antinode A appears at each of both end portions of the flow path 20 in the Y direction.

For example, as shown in FIG. 2, when the standing wave SW of the first-order mode is generated, the node N appears at a center portion of the flow path 20 in the Y direction, and the antinode A appears at each of both end portions of the flow path 20 in the Y direction. In this case, in the process of the fine particles M dispersed in the fluid S flowing through the flow path 20, the fine particles M are converged to a range corresponding to the node N of the standing wave SW, that is, the center portion of the flow path 20 in the Y direction (acoustic convergence).

Here, the flow path 20 is divided into, in the Y direction, a node region RN corresponding to the node N of the standing wave SW and antinode regions RA corresponding to the antinodes A of the standing wave SW.

When the flow path width of the flow path 20 is L and the mode order of the standing wave SW is n, each node region RN is in a range from a center of each node N to ±L/4n in the Y direction, and each antinode region RA is in a range other than the range of the node region RN.

With respect to the flow path 20 divided into the regions in this way, the ultrasonic element 44, specifically, the fluid contact surface 422 of the vibrator 421 faces any antinode region RA in the Z direction. In other words, the opening portion 411 of the element substrate 41 opens toward the antinode region RA.

Depending on a size of the ultrasonic element 44, the ultrasonic element 44 may be present not only in the antinode region RA but also in the node region RN. However, it is desirable that the vibrator 421 does not face the node N.

FIG. 2 shows the standing wave SW of the first-order mode, but the standing wave SW generated in the present embodiment may be any standing wave of an order mode equal to or greater than the first-order mode.

Effects of Present Embodiment

As described above, the fluid device 10 according to the present embodiment includes the flow path 20 through which the fluid S flows, and the ultrasonic wave transmitter 40 (first ultrasonic wave transmitter) that transmits ultrasonic waves to the fluid S to generate the standing wave SW in the fluid S in the flow path 20 along the first direction (Y direction) orthogonal to the flowing direction of the fluid S. The ultrasonic wave transmitter 40 is in contact with the fluid S and faces the antinode region RA (first antinode region) corresponding to any antinode A (first antinode) in the standing wave SW.

In such a configuration, since the ultrasonic wave transmitter 40 is in contact with the fluid 5, the flow path substrate 30 is not interposed in a propagation path of the ultrasonic wave from the ultrasonic wave transmitter 40 to the fluid S. That is, the ultrasonic wave is directly transmitted from the ultrasonic wave transmitter 40 to the fluid S.

Since the ultrasonic wave transmitter 40 faces the antinode region RA corresponding to any antinode A in the standing wave SW, the fluid S can be efficiently vibrated.

According to the above configuration, it is possible to improve generation efficiency of the standing wave SW in the flow path 20. Accordingly, the drive voltage and the driving frequency that are applied to the ultrasonic wave transmitter 40 can be set to be lower than those in the related art, and the width of the flow path 20 in which the standing wave SW is generated can be wider than that in the related art. As a result, a volume flow rate of the fluid S that can be treated using the fluid device 10 can be increased.

In the present embodiment, the ultrasonic wave transmitter 40 includes the ultrasonic element 44, and the ultrasonic element 44 includes the vibrator 421 having the fluid contact surface 422 that comes into contact with the fluid S, and the piezoelectric element 43 that is provided at the vibrator 421 and generates flexural vibration to the vibrator 421 in the normal direction of the fluid contact surface 422.

In such a configuration, since the flexural vibration of the vibrator 421 is converted into the compressional wave of the fluid S, it is possible to efficiently transmit the ultrasonic wave to the fluid S.

In the present embodiment, the fluid device 10 is formed such that the above expression (6) is established. That is, the thickness of the vibrator 421 that comes into contact with the fluid S is formed to be smaller than ¼ of the wavelength λ of the longitudinal wave generated in the vibrator 421.

In such a configuration, the generation of the longitudinal wave in the vibrator 421 and the propagation of the longitudinal wave from the vibrator 421 to the fluid S are prevented, and the matching of the acoustic impedances between the vibrator 421 and the fluid S in contact with the vibrator 421 is achieved. As a result, the propagation efficiency of the ultrasonic wave from the ultrasonic element 44 to the fluid S can be improved.

In the present embodiment, the dimension (flow path depth) H of the flow path 20 in the Z direction (second direction orthogonal to each of the flowing direction and the first direction) is smaller than the dimension (flow path width) of the flow path 20 in the Y direction.

Accordingly, in the flow path 20, the generation of the standing wave in the Z direction can be prevented, and the standing wave SW in the Y direction can be suitably generated.

Second Embodiment

Next, a second embodiment will be described. In the following description, the same components as those in the first embodiment are denoted by the same reference numerals, and the description thereof will be omitted or simplified.

FIG. 3 is a cross-sectional view schematically showing a part of a fluid device 10A according to the second embodiment.

As shown in FIG. 3, in the second embodiment, one of two antinodes that appear in the standing wave SW, are different from each other, and have opposite phases of pressure waveforms is referred to as a first antinode A1, and the other antinode is referred to as a second antinode A2. An antinode region corresponding to the first antinode A1 is referred to as a first antinode region RA1, and an antinode region corresponding to the second antinode A2 is referred to as a second antinode region RA2.

In the second embodiment, the ultrasonic wave transmitter 40 is disposed in each of the first antinode region RA1 and the second antinode region RA2.

Here, the ultrasonic wave transmitter 40 facing the first antinode region RA1 is referred to as a first ultrasonic wave transmitter 40A, and the ultrasonic wave transmitter 40 facing the second antinode region RA2 is referred to as a second ultrasonic wave transmitter 40B.

The first ultrasonic wave transmitter 40A and the second ultrasonic wave transmitter 40B have the same configuration as the ultrasonic wave transmitter 40 according to the first embodiment, and are provided in the flow path substrate 30 so as to close the through holes 311 penetrating the upper wall portion 31 in the Z direction.

In the second embodiment, between the first ultrasonic wave transmitter 40A and the second ultrasonic wave transmitter 40B, the drive signals for driving the ultrasonic elements 44 have opposite phases. That is, an ultrasonic wave transmitted by the first ultrasonic wave transmitter 40A and an ultrasonic wave transmitted by the second ultrasonic wave transmitter 40B have opposite phases. Both the first ultrasonic wave transmitter 40A and the second ultrasonic wave transmitter 40B generate the standing wave SW as described above.

FIG. 3 shows the standing wave SW of the first-order mode, but the standing wave SW generated in the present embodiment may be any standing wave of an order mode equal to or greater than the first-order mode. The first antinode region RA1 in which the first ultrasonic wave transmitter 40A is disposed and the second antinode region RA2 in which the second ultrasonic wave transmitter 40B is disposed can be determined based on the mode order of the standing wave SW generated in the flow path 20 and the dimension of the flow path 20 in the Y direction.

Effects of Second Embodiment

According to the second embodiment described above, the same effects as the fluid device 10 according to the first embodiment can be achieved.

Since the fluid device 10A according to the second embodiment includes the first ultrasonic wave transmitter 40A and the second ultrasonic wave transmitter 40B described above, the acoustic power applied to the inside of the flow path 20 can be increased as compared with the first embodiment. Accordingly, it is possible to further improve the generation efficiency of the standing wave SW in the flow path 20.

In the fluid device 10A according to the second embodiment, the ultrasonic waves transmitted by the first ultrasonic wave transmitter 40A and the ultrasonic waves transmitted by the second ultrasonic wave transmitter 40B have opposite phases.

According to such a configuration, even when the standing wave SW of the first-order mode in which the antinodes A having the same phase do not appear is generated, the first ultrasonic wave transmitter 40A and the second ultrasonic wave transmitter 40B can be provided.

Third Embodiment

Next, a third embodiment will be described.

Figure 4:
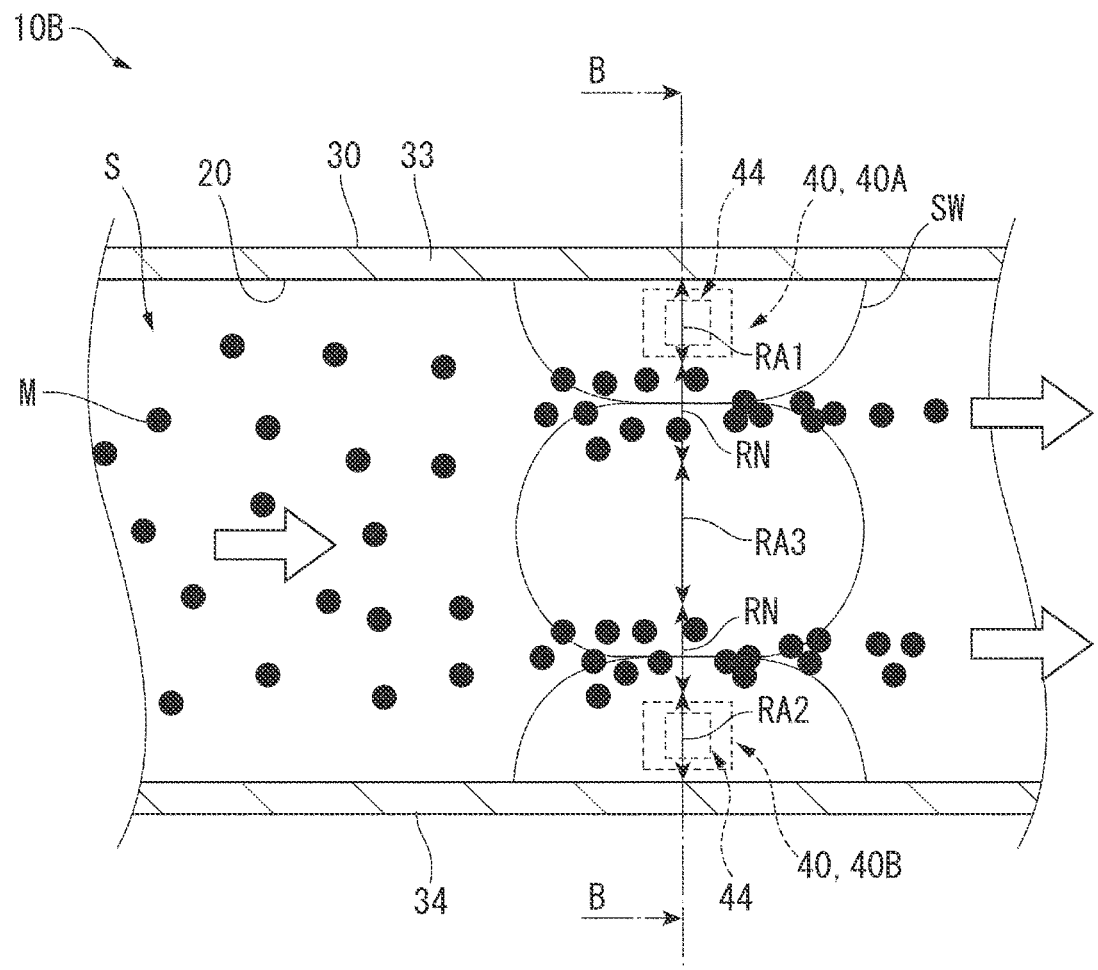
FIG. 4 is a cross-sectional view schematically showing a part of a fluid device according to a third embodiment.
Figure 5:
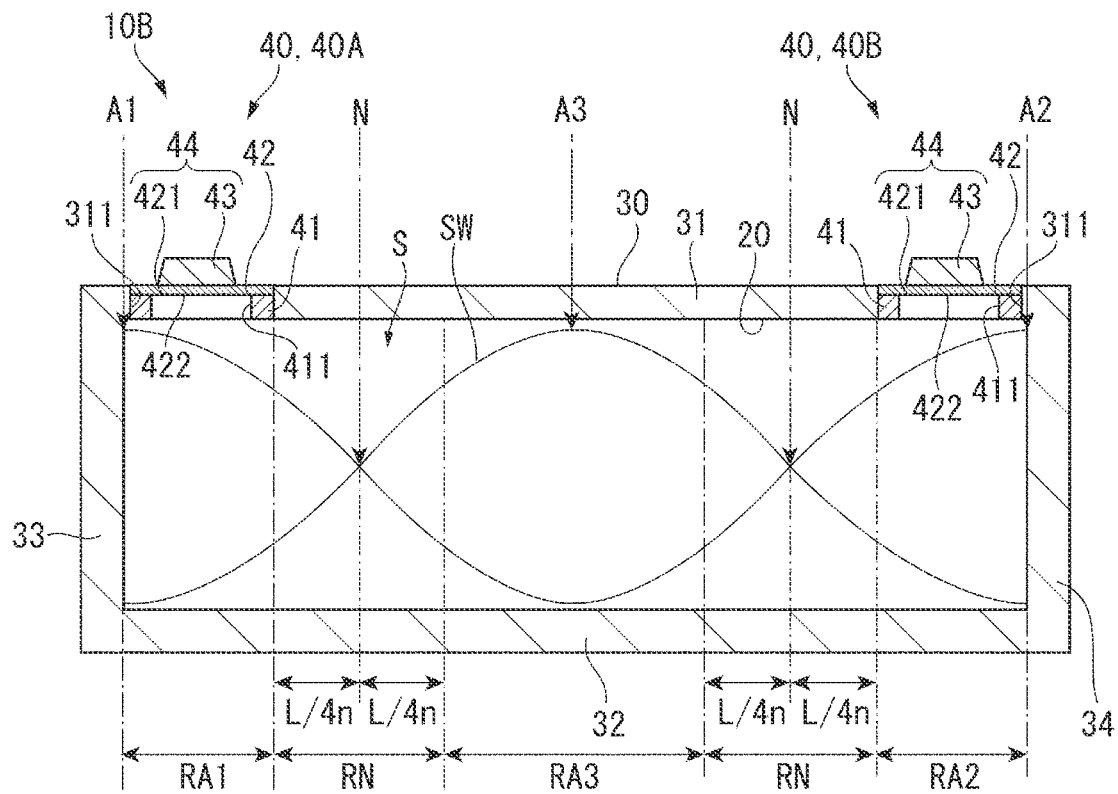
FIG. 5 is a cross-sectional view taken along a line B-B in FIG. 4.

FIG. 4 is a cross-sectional view schematically showing a part of a fluid device 10B according to the third embodiment, and FIG. 5 is a cross-sectional view taken along a line B-B in FIG. 4.

The fluid device 10B according to the third embodiment corresponds to a modification of the fluid device 10A according to the second embodiment, and has substantially the same configuration as the fluid device 10A according to the second embodiment.

As shown in FIGS. 4 and 5, in the third embodiment, the standing wave SW of an order mode equal to or greater than a second-order mode is generated in the flow path 20. Among any three antinodes that appear in the standing wave SW and are different from one another, two antinodes whose pressure waveforms are in the same phase are referred to as the first antinode A1 and the second antinode A2, and an antinode that is disposed between the first antinode A1 and the second antinode A2 and whose pressure waveform is in opposite phase from the first antinode A1 and the second antinode A2 is referred to as a third antinode A3. An antinode region corresponding to the first antinode A1 is referred to as the first antinode region RA1, an antinode region corresponding to the second antinode A2 is referred to as the second antinode region RA2, and an antinode region corresponding to the third antinode A3 is referred to as a third antinode region RA3.

In the third embodiment, similarly to the second embodiment, the ultrasonic wave transmitter 40 is disposed in each of the first antinode region RA1 and the second antinode region RA2.

Here, the ultrasonic wave transmitter 40 facing the first antinode region RA1 is referred to as the first ultrasonic wave transmitter 40A, and the ultrasonic wave transmitter 40 facing the second antinode region RA2 is referred to as the second ultrasonic wave transmitter 40B.

The first ultrasonic wave transmitter 40A and the second ultrasonic wave transmitter 40B have the same configuration as the ultrasonic wave transmitter 40 according to the first embodiment, and are provided in the flow path substrate 30 so as to close the through holes 311 penetrating the upper wall portion 31 in the Z direction.

On the other hand, in the third embodiment, different from the second embodiment, the drive signals for driving the ultrasonic elements 44 have the same phases between the first ultrasonic wave transmitter 40A and the second ultrasonic wave transmitter 40B. That is, an ultrasonic wave transmitted by the first ultrasonic wave transmitter 40A and an ultrasonic wave transmitted by the second ultrasonic wave transmitter 40B have the same phases. Both the first ultrasonic wave transmitter 40A and the second ultrasonic wave transmitter 40B generate the standing wave SW as described above.

FIGS. 4 and 5 show the standing wave SW of the second-order mode, but the standing wave SW generated in the present embodiment may be any standing wave of an order mode equal to or greater than the second-order mode. The first antinode region RA1 in which the first ultrasonic wave transmitter 40A is disposed and the second antinode region RA2 in which the second ultrasonic wave transmitter 40B is disposed can be determined based on the mode order of the standing wave SW generated in the flow path 20 and the dimension of the flow path 20 in the Y direction.

Effects of Third Embodiment

According to the third embodiment described above, the same effects as the fluid device 10 according to the first embodiment can be achieved.

Similarly to the fluid device 10A according to the second embodiment, the fluid device 10B according to the third embodiment includes the first ultrasonic wave transmitter 40A and the second ultrasonic wave transmitter 40B described above, the acoustic power applied to the inside of the flow path 20 can be increased as compared with the first embodiment. Accordingly, it is possible to further improve the generation efficiency of the standing wave SW in the flow path 20.

In the fluid device 10B according to the third embodiment, different from the fluid device 10A according to the second embodiment, the ultrasonic waves transmitted by the first ultrasonic wave transmitter 40A and the ultrasonic waves transmitted by the second ultrasonic wave transmitter 40B have the same phase.

According to such a configuration, since the same drive signal can be input to each of the ultrasonic elements 44 of the first ultrasonic wave transmitter 40A and the second ultrasonic wave transmitter 40B, a configuration of the drive unit that drives the fluid device 10B can be simplified.

Fourth Embodiment

Next, a fourth embodiment will be described.

Figure 6:
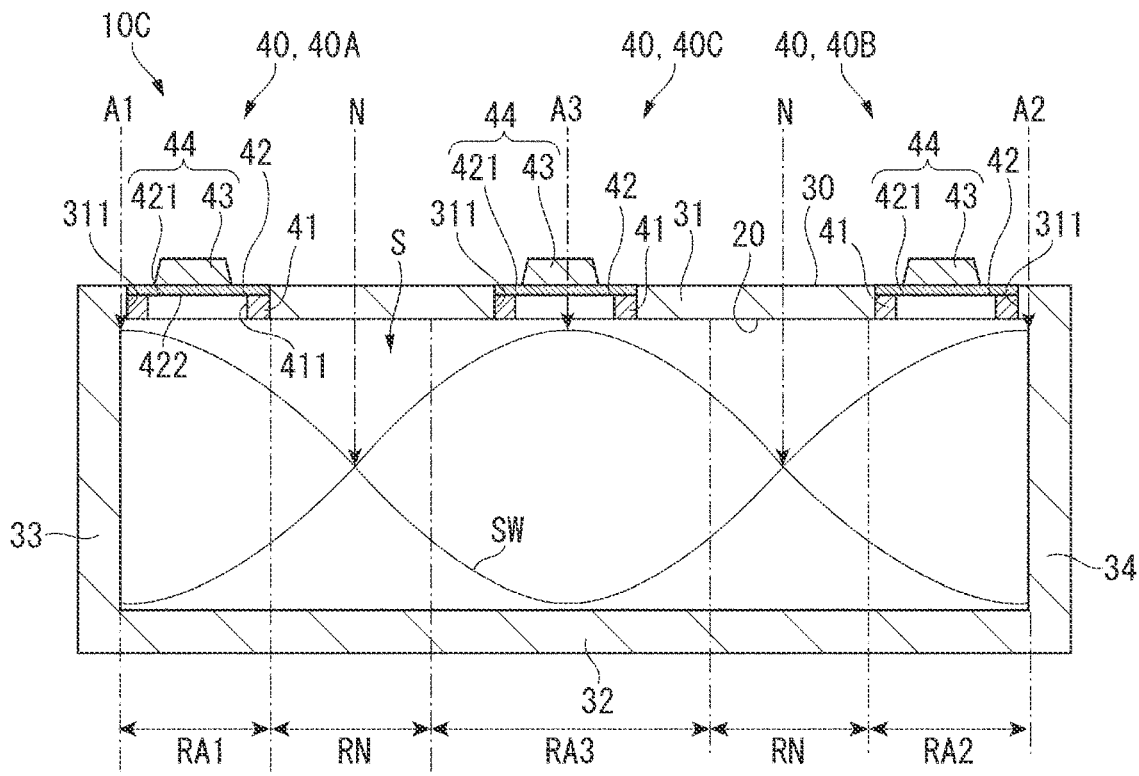
FIG. 6 is a cross-sectional view schematically showing a part of a fluid device according to a fourth embodiment.
Figure 6:
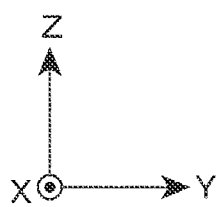

FIG. 6 is a cross-sectional view schematically showing a part of a fluid device 10C according to the fourth embodiment.

The fluid device 10C according to the fourth embodiment corresponds to another modification of the fluid device 10A according to the second embodiment, and similarly to the fluid device 10B according to the third embodiment, generates the standing wave SW of an order mode equal to or greater than the second-order mode in the flow path 20.

Therefore, as shown in FIG. 6, in the fourth embodiment, similarly to the third embodiment, among three antinodes that appear in the standing wave SW and are different from one another, two antinodes whose pressure waveforms are in the same phase are referred to as the first antinode A1 and the second antinode A2, and an antinode that is disposed between the first antinode A1 and the second antinode A2 and whose pressure waveform is in opposite phase from the first antinode A1 and the second antinode A2 is referred to as the third antinode A3. An antinode region corresponding to the first antinode A1 is referred to as the first antinode region RA1, an antinode region corresponding to the second antinode A2 is referred to as the second antinode region RA2, and an antinode region corresponding to the third antinode A3 is referred to as the third antinode region RA3.

In the fourth embodiment, the ultrasonic wave transmitter 40 is disposed in each of the first antinode region RA1, the second antinode region RA2, and the third antinode region RA3.

Here, the ultrasonic wave transmitter 40 facing the first antinode region RA1 is referred to as the first ultrasonic wave transmitter 40A, the ultrasonic wave transmitter 40 facing the second antinode region RA2 is referred to as the second ultrasonic wave transmitter 40B, and the ultrasonic wave transmitter 40 facing the third antinode region RA3 is referred to as a third ultrasonic wave transmitter 40C.

The first ultrasonic wave transmitter 40A, the second ultrasonic wave transmitter 40B, and the third ultrasonic wave transmitter 40C have the same configuration as the ultrasonic wave transmitter 40 according to the first embodiment, and are provided in the flow path substrate 30 so as to close the through holes 311 penetrating the upper wall portion 31 in the Z direction.

In the fourth embodiment, between the first ultrasonic wave transmitter 40A and the second ultrasonic wave transmitter 40B, the drive signals for driving the ultrasonic elements 44 have the same phases. That is, an ultrasonic wave transmitted by the first ultrasonic wave transmitter 40A and an ultrasonic wave transmitted by the second ultrasonic wave transmitter 40B have the same phases.

On the other hand, between the third ultrasonic wave transmitter 40C, and the first ultrasonic wave transmitter 40A and the second ultrasonic wave transmitter 40B, the drive signals for driving the ultrasonic elements 44 have opposite phases. That is, an ultrasonic wave transmitted by the third ultrasonic wave transmitter 40C has an opposite phase from the ultrasonic wave transmitted by the first ultrasonic wave transmitter 40A and the ultrasonic wave transmitted by the second ultrasonic wave transmitter 40B.

The first ultrasonic wave transmitter 40A, the second ultrasonic wave transmitter 40B, and the third ultrasonic wave transmitter 40C generate the standing wave SW as described above.

FIG. 6 shows the standing wave SW of the second-order mode, but the standing wave SW generated in the present embodiment may be any standing wave of an order mode equal to or greater than the second-order mode. The first antinode region RA1 in which the first ultrasonic wave transmitter 40A is disposed, the second antinode region RA2 in which the second ultrasonic wave transmitter 40B is disposed, and the third antinode region RA3 in which the third ultrasonic wave transmitter 40C is disposed can be determined based on the mode order of the standing wave SW generated in the flow path 20 and the dimension of the flow path 20 in the Y direction.

Effect of Fourth Embodiment

According to the fourth embodiment described above, the same effects as the fluid device 10 according to the first embodiment can be achieved.

Since the fluid device 100 according to the fourth embodiment has a configuration in which the third ultrasonic wave transmitter 40C is further added to the fluid device 10B according to the third embodiment, the acoustic power applied to the inside of the flow path 20 can be further increased as compared with the third embodiment. Accordingly, it is possible to further improve the generation efficiency of the standing wave SW in the flow path 20.

Fifth Embodiment

Next, a fifth embodiment will be described.

Figure 7:
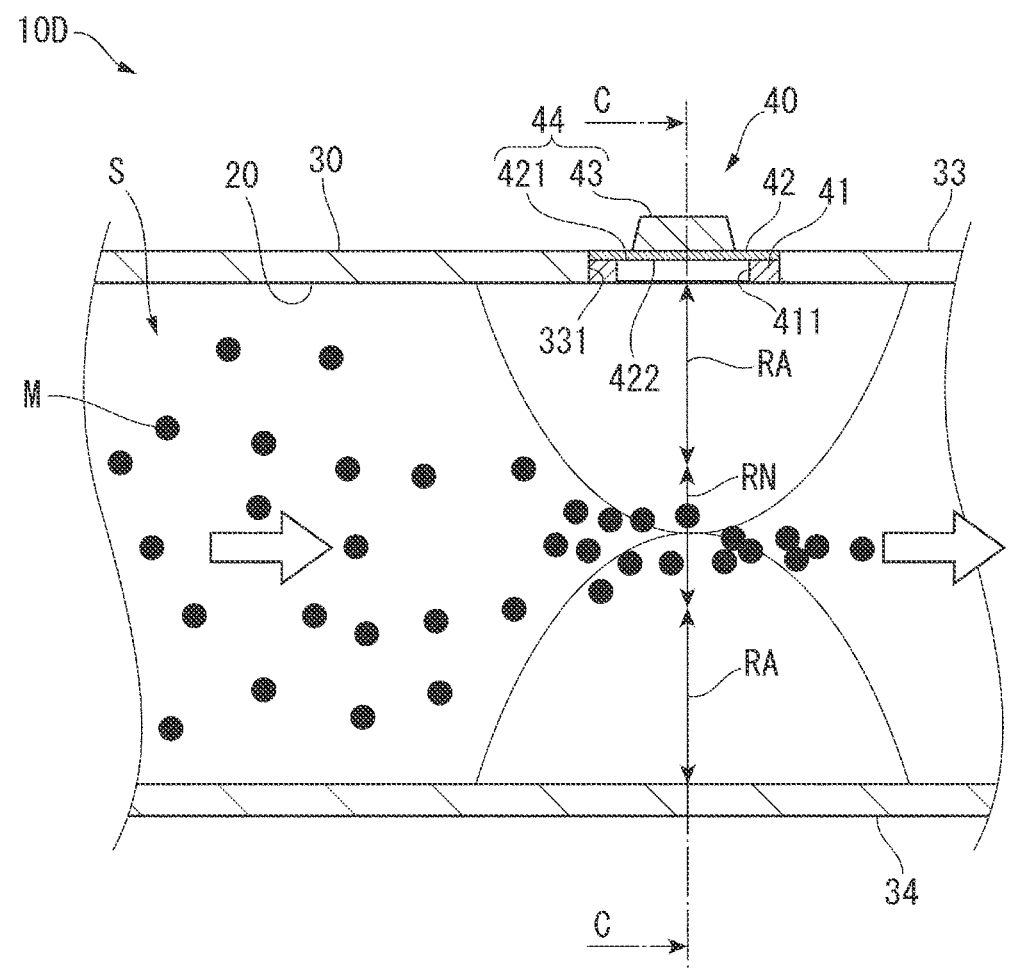
FIG. 7 is a cross-sectional view schematically showing a part of a fluid device according to a fifth embodiment.
Figure 7:
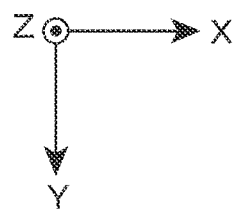
Figure 8:
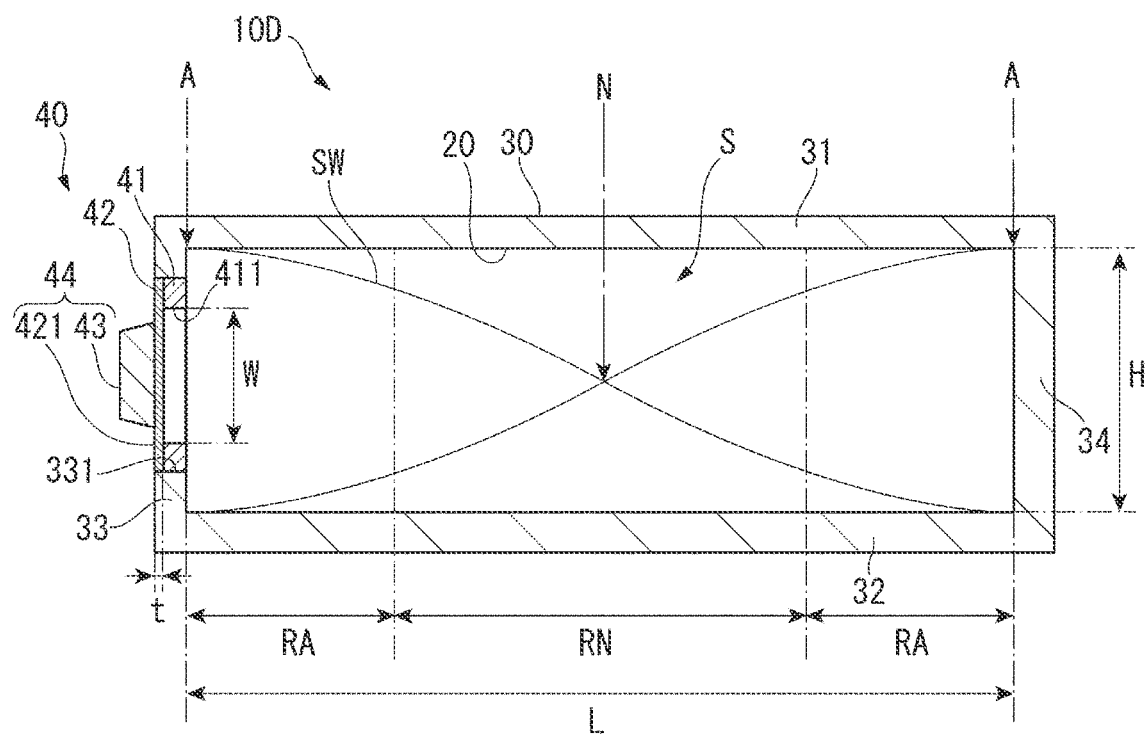
FIG. 8 is a cross-sectional view taken along a line B-B in FIG. 7.

FIG. 7 is a cross-sectional view schematically showing a part of a fluid device 10D according to the fifth embodiment, and FIG. 8 is a cross-sectional view taken along a line C-C in FIG. 7.

As shown in FIGS. 7 and 8, in the fluid device 10D according to the fifth embodiment, arrangement of the ultrasonic wave transmitter 40 is different as compared with the fluid device 10 according to the first embodiment.

Specifically, in the flow path substrate 30 according to the fifth embodiment, a through hole 331 penetrating the side wall portion 33 in the Y direction is formed instead of the through hole 311 penetrating the upper wall portion 31 in the Z direction according to the first embodiment. The ultrasonic wave transmitter 40 is provided at the flow path substrate 30 so as to close the through hole 331 of the side wall portion 33, thereby forming a part of the wall portion of the flow path 20.

The element substrate 41 according to the present embodiment is disposed in the through hole 331 of the flow path substrate 30 such that the thickness direction of the element substrate 41 is along the Y direction, and the outer peripheral surface of the element substrate 41 is in liquid-tight contact with an inner peripheral surface of the through hole 331 of the flow path substrate 30.

Here, the ultrasonic element 44 is disposed such that the thickness direction (the normal direction of the fluid contact surface 422) of the vibration film 42 is along the Y direction.

The ultrasonic wave transmitter 40 faces, in the Y direction, the antinode region RA disposed at one end portion of the flow path 20 in the Y direction. In other words, the opening portion 411 of the element substrate 41 opens toward the antinode region RA.

Effect of Fifth Embodiment

According to the fifth embodiment described above, the same effects as the fluid device 10 according to the first embodiment can be achieved.

In the fifth embodiment, the ultrasonic element 44 is disposed such that the normal direction of the fluid contact surface 422 is along the Y direction.

According to such a configuration, a main transmission direction of the ultrasonic wave from the ultrasonic element 44 coincides with a propagation direction of the ultrasonic wave combining the standing waves SW in the flow path 20. Accordingly, it is possible to further improve the generation efficiency of the standing wave SW.

Sixth Embodiment

Next, a sixth embodiment will be described.

Figure 9:
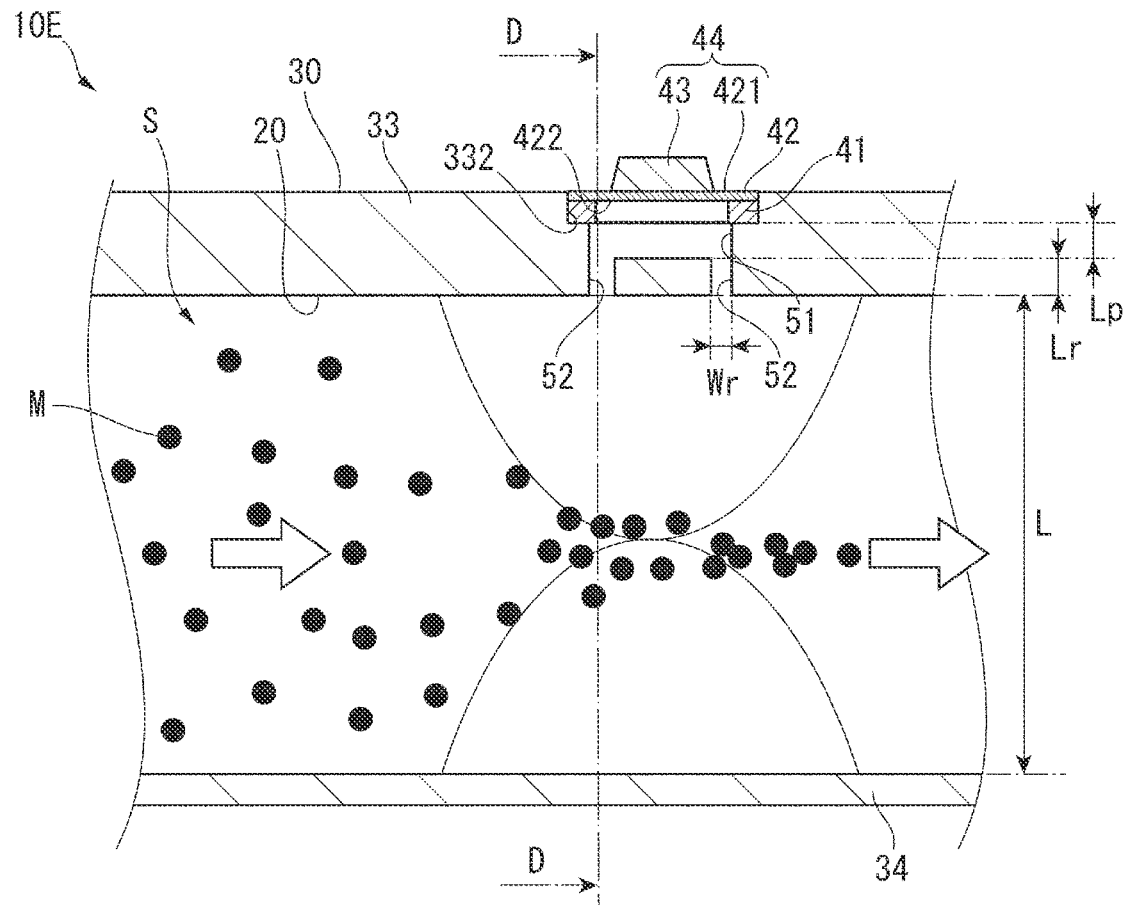
FIG. 9 is a cross-sectional view schematically showing a part of a fluid device according to a sixth embodiment.
Figure 10:
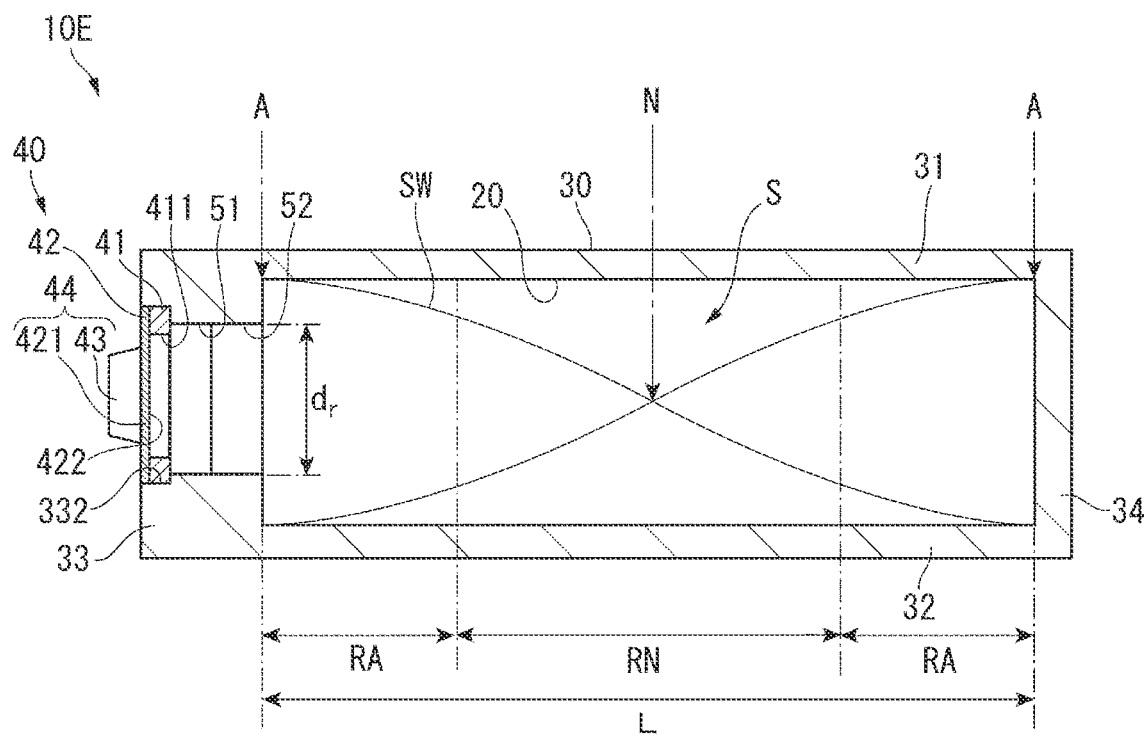
FIG. 10 is a cross-sectional view taken along a line D-D in FIG. 9.
Figure 10:
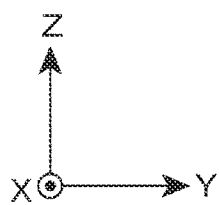

FIG. 9 is a cross-sectional view schematically showing a part of a fluid device 10E according to the sixth embodiment, and FIG. 10 is a cross-sectional view taken along a line D-D in FIG. 9.

As shown in FIGS. 9 and 10, the fluid device 10E according to the sixth embodiment corresponds to a modification of the fifth embodiment, and a pressure chamber 51 and a communication path 52 are formed between the flow path 20 and the ultrasonic wave transmitter 40 in the flow path substrate 30.

The pressure chamber 51 is a storage chamber of the fluid S formed in the flow path substrate 30, and is spaced apart from the flow path 20 in the Y direction. In the present embodiment, the pressure chamber 51 is formed in the side wall portion 33 on one side of the flow path 20 in the Y direction, and may be formed in the side wall portion 34 on the other side of the flow path 20 in the Y direction.

The communication path 52 is a flow path that is formed inside the side wall portion 33 of the flow path substrate 30 and communicates the pressure chamber 51 with the flow path 20. The communication path 52 is formed along the Y direction and is coupled to a side portion of the flow path 20.

The flow path 20 is coupled to the pressure chamber 51 via the communication path 52, and the fluid S flowing through the flow path 20 flows into the pressure chamber 51. The pressure chamber 51 is filled with the fluid S.

In FIGS. 9 and 10, two communication paths 52 are provided at an interval in the X direction for one pressure chamber 51, and each communication path 52 communicates the pressure chamber 51 with the flow path 20. The number of communication paths 52 is not limited to two, and may be one or more.

In the sixth embodiment, a through hole 332 that connects the pressure chamber 51 and the outside in the Y direction is formed in a portion of the side wall portion 33 of the flow path substrate 30. The portion is a wall portion of the pressure chamber 51. The ultrasonic wave transmitter 40 is provided at the flow path substrate 30 so as to close the through hole 332, thereby forming a part of the wall portion of the pressure chamber 51. The element substrate 41 is disposed in the through hole 332 of the flow path substrate 30 such that the thickness direction of the element substrate 41 is along the Y direction, and the outer peripheral surface of the element substrate 41 is in liquid-tight contact with an inner peripheral surface of the through hole 332 of the flow path substrate 30.

Here, the ultrasonic element 44 is disposed such that the thickness direction (the normal direction of the fluid contact surface 422) of the vibration film 42 is along the Y direction. The fluid contact surface 422 of the vibrator 421 is in contact with the fluid S in the pressure chamber 51.

In the sixth embodiment, since the standing wave is generated in the fluid S in the flow path 20, and the standing wave is not generated in the fluid S in the communication path 52 and the pressure chamber 51, the pressure chamber 51 and the communication path 52 satisfy the following expression (15).

$$Lr + Lp \neq \frac{L \times M}{n} \quad (15)$$

In the above expression (15), Lr is a dimension [m] of the communication path 52 in the Y direction, Lp is a dimension [m] of the pressure chamber 51 in the Y direction, M is a natural number, n is the mode order of the standing wave SW, and L is the dimension (flow path width) [m] of the flow path 20 in the Y direction.

The fluid device 10E according to the sixth embodiment satisfies the following expressions (16) to (18).

$$w_r < 4 \times L \times n^{-\frac{1}{2}} \quad (16)$$

$$w_r \leq 0.3 \times d_r \quad (17)$$

$$\frac{Sr \times L}{n} \geq \delta \times Sb \quad (18)$$

In the above expressions (16), (17), $W_r$ is a width [m] of the communication path 52 in the X direction, L is the flow path width [m], n is the mode order of the standing wave SW, and dr is a depth [m] of the communication path 52 in the Z direction.

In a case where the above expressions (16), (17) are satisfied, when an ultrasonic wave emitted from the communication path 52 into the flow path 20 is reflected by a wall surface of the flow path 20 and returns to the communication path 52, a beam width of the ultrasonic wave becomes larger than the width $W_r$ of the communication path 52. That is, the beam width of the ultrasonic wave spreads wider than the width $W_r$ of the communication path 52.

In the above expression (18), Sr is a flow path cross-sectional area [m²] of all the communication paths 52 orthogonal to the Y direction, L is the flow path width [m], n is the mode order of the standing wave SW, Sb is an area [m²] of the fluid contact surface 422 of the vibrator 421, and 5 is a displacement amount [m] of the vibrator 421 at the time of the vibration.

When the expression (18) is satisfied, a value obtained by dividing a volume of a range in the flow path 20 facing the communication path 52 in the Y direction by the mode order n of the standing wave SW is equal to or greater than a maximum variation amount of a volume of the pressure chamber 51 caused by the flexural vibration of the vibrator 421.

Effect of Sixth Embodiment

According to the fluid device 10E in the sixth embodiment, the same effects as the fluid device 10 according to the first embodiment can be achieved.

In the fluid device 10E according to the sixth embodiment, similarly to the fluid device 10D according to the fifth embodiment, the main transmission direction of the ultrasonic wave from the ultrasonic element 44 coincides with the propagation direction of the ultrasonic wave combining the standing waves SW in the flow path 20, so that the generation efficiency of the standing wave SW can be further improved.

Here, since the fluid devices 10, 10D according to the first embodiment and the fifth embodiment do not include the pressure chamber 51 and the communication path 52 as in the sixth embodiment, and the vibrator 421 faces the fluid S in the flow path 20, the ultrasonic wave reflected in the flow path 20 directly returns to the vibrator 421. Therefore, unless the ultrasonic element 44 transmits an ultrasonic wave having an acoustic power equal to or higher than an initially applied acoustic power, the ultrasonic element 44 may be defeated by the reflected and returned ultrasonic wave, and it is difficult to superimpose the acoustic power of the ultrasonic wave in the flow path 20. That is, the acoustic power of the ultrasonic wave in the flow path 20 is determined by an acoustic power of a first transmitted ultrasonic wave, and it is difficult to add the acoustic power.

On the other hand, the fluid device 10E according to the sixth embodiment further includes the pressure chamber 51 formed separately from the flow path 20, and the communication path 52 communicating the flow path 20 and the pressure chamber 51, and the ultrasonic wave transmitter 40 is in contact with the fluid S in the pressure chamber 51.

According to the present embodiment, a part of the ultrasonic wave reflected by the wall surface of the flow path 20 returns to the ultrasonic wave transmitter 40 via the communication path 52, but a remaining part of the ultrasonic wave is reflected again by the wall surface of the flow path 20. That is, it is possible to reduce a proportion of the ultrasonic wave returning to the vibrator 421. Therefore, it is possible to prevent the ultrasonic wave transmitted from the ultrasonic wave transmitter 40 from being defeated by the ultrasonic wave reflected and returned from the flow path 20, increase a pressure in the pressure chamber 51, and add the acoustic power to the inside of the flow path 20. Accordingly, it is possible to easily generate a standing wave having a large acoustic power in the flow path 20.

In particular, since the fluid device 10E according to the sixth embodiment satisfies the above expressions (16), (17), the beam width of the ultrasonic wave is larger than the width $W_r$ of the communication path 52, and thus, an effect of reducing the proportion of the ultrasonic wave returning to the vibrator 421 can be suitably exhibited.

In the sixth embodiment, the fluid device 10E is formed such that the above expression (18) is established. Here, the value obtained by dividing the volume of the range in the flow path 20 facing the communication path 52 in the Y direction by the mode order n of the standing wave SW corresponds to a volume variation of a medium in the communication path 52. When the value is equal to or larger than the maximum variation amount of the volume of the pressure chamber 51 caused by the flexural vibration of the vibrator 421, the volume variation of the medium in the pressure chamber 51 due to deformation of the vibration film 42 is discharged as a volume variation of a medium in the communication path 52, and thus it is possible to prevent the pressure increase in the pressure chamber 51. Therefore, it is possible to prevent the vibration film 42 and the piezoelectric element 43 from being damaged.

Modifications

The present disclosure is not limited to the embodiment described above, and configurations obtained through modifications, alterations, and appropriate combinations of the embodiments within a scope of being capable of achieving the object of the present disclosure are included in the present disclosure.

First Modification

In each of the above embodiments, the example is described in which the ultrasonic wave transmitter 40 includes one ultrasonic element 44. However, the ultrasonic wave transmitter 40 may include a plurality of ultrasonic elements 44.

Specifically, a plurality of opening portions 411 may be formed in an array for the element substrate 41. In this case, a portion of the vibration film 42 provided at the element substrate 41 can constitute the vibrator 421. The portion of the vibration film 42 overlaps each opening portion 411. By providing the piezoelectric element 43 for each vibrator 421, a plurality of ultrasonic elements 44 can be constituted.

In the above-described sixth embodiment, when the ultrasonic wave transmitter 40 includes the plurality of ultrasonic elements 44, Sb in the above expression (18) is a total area of the fluid contact surfaces 422 of the plurality of ultrasonic elements 44.

Second Modification

The specific configuration of the ultrasonic wave transmitter 40 described in each of the above embodiments can be modified in various ways.

For example, the element substrate 41 may be disposed outside the through hole 311 of the flow path substrate 30. In this case, the opening portion 411 of the element substrate 41 overlaps the through hole 311 of the flow path substrate 30, and a lower surface of the element substrate 41 is in liquid-tight contact with an upper surface of the flow path substrate 30.

The ultrasonic wave transmitter 40 may not include the element substrate 41, and the vibration film 42 may be provided at the flow path substrate 30. In this case, a portion of the vibration film 42 overlapping the through holes 311, 331 of the flow path substrate 30 constitutes the vibrator 421.

Third Modification

In each of the above embodiments, the standing wave SW is generated in the width direction (Y direction) of the flow path 20 as the first direction orthogonal to the flowing direction of the fluid S. However, the standing wave SW may be generated in the depth (Z direction) of the flow path 20. In this case, a configuration can be applied in which the Y direction and the Z direction that are described in the above embodiments are appropriately replaced with each other.

Overview of Present Disclosure

A fluid device according to an aspect of the present disclosure includes: a flow path through which a fluid flows; and a first ultrasonic wave transmitter configured to transmit an ultrasonic wave to the fluid to generate a standing wave to the fluid in the flow path along a first direction orthogonal to a flowing direction of the fluid. The first ultrasonic wave transmitter is in contact with the fluid and faces a first antinode region corresponding to any first antinode in the standing wave.

In such a configuration, since the first ultrasonic wave transmitter is in contact with the fluid, another member is not interposed in a propagation path of the ultrasonic wave from the first ultrasonic wave transmitter to the fluid. That is, the ultrasonic wave is directly transmitted from the first ultrasonic wave transmitter to the fluid.

Since the first ultrasonic wave transmitter faces the antinode region corresponding to any antinode in the standing wave, the fluid can be efficiently vibrated.

According to the above configuration, it is possible to improve generation efficiency of the standing wave in the flow path. Accordingly, a drive voltage and a driving frequency that are applied to the first ultrasonic wave transmitter can be set to be lower than those in the related art, and a width of the flow path in which the standing wave SW is generated can be wider than that in the related art. As a result, a volume flow rate of the fluid that can be treated using the fluid device can be increased.

The fluid device according to the present aspect further includes a second ultrasonic wave transmitter configured to transmit an ultrasonic wave to the fluid to generate the standing wave together with the first ultrasonic wave transmitter. The second ultrasonic wave transmitter is in contact with the fluid and faces a second antinode region corresponding to a second antinode different from the first antinode in the standing wave.

In such a configuration, an acoustic power applied to the inside of the fluid can be further increased. Accordingly, it is possible to further improve the generation efficiency of the standing wave in the flow path.

In the fluid device according to the present aspect, the ultrasonic wave transmitted by the first ultrasonic wave transmitter and the ultrasonic wave transmitted by the second ultrasonic wave transmitter have opposite phases.

According to such a configuration, even when the standing wave of a first-order mode in which the antinodes having the same phase do not appear is generated, the first ultrasonic wave transmitter and the second ultrasonic wave transmitter can be provided.

In the fluid device according to the present aspect, the ultrasonic wave transmitted by the first ultrasonic wave transmitter and the ultrasonic wave transmitted by the second ultrasonic wave transmitter may have the same phase.

According to such a configuration, since the same drive signal can be input to each of the first ultrasonic wave transmitter and the second ultrasonic wave transmitter, a configuration of a drive unit configured to drive the fluid device can be simplified.

The fluid device according to the present aspect further includes a third ultrasonic wave transmitter configured to transmit an ultrasonic wave to the fluid to generate the standing wave together with the first ultrasonic wave transmitter and the second ultrasonic wave transmitter. The third ultrasonic wave transmitter is in contact with the fluid and faces a third antinode region corresponding to a third antinode between the first antinode and the second antinode in the standing wave. The ultrasonic wave transmitted by the third ultrasonic wave transmitter has an opposite phase from the ultrasonic wave transmitted by the first ultrasonic wave transmitter and the ultrasonic wave transmitted by the second ultrasonic wave transmitter.

In such a configuration, an acoustic power applied to the inside of the fluid can be further increased. Accordingly, it is possible to further improve the generation efficiency of the standing wave in the flow path.

In the fluid device according to the present aspect, the first ultrasonic wave transmitter includes one or more ultrasonic elements. The ultrasonic element includes a vibrator having a fluid contact surface that comes into contact with the fluid, and a piezoelectric element that is provided at the vibrator and that is configured to generate flexural vibration to the vibrator in a normal direction of the fluid contact surface.

In such a configuration, since the flexural vibration of the vibrator is converted into a compressional wave of the fluid, it is possible to efficiently transmit the ultrasonic wave to the fluid.

In the fluid device according to the present aspect, the vibrator is disposed such that a thickness direction of the vibrator is along the first direction.

According to such a configuration, a main transmission direction of the ultrasonic wave from the ultrasonic element coincides with a propagation direction of the ultrasonic wave combining the standing waves in the flow path. Accordingly, it is possible to further improve the generation efficiency of the standing wave.

$$t < \frac{C'}{C} \times \frac{L}{2n}$$

In the fluid device according to the present aspect, a thickness [m] of the vibrator is t, a sound velocity [m/s] of a medium of the fluid is C, an average sound velocity [m/s] of a longitudinal wave transmitted in the vibrator is C', a dimension [m] of the flow path in the first direction is L, and a mode order of the standing wave is n.

In such a configuration, generation of the longitudinal wave in the vibrator and propagation of the longitudinal wave from the vibrator to the fluid are prevented, and matching of acoustic impedances between the vibrator and the fluid in contact with the vibrator is achieved. As a result, propagation efficiency of the ultrasonic wave from the ultrasonic element to the fluid can be improved.

In the fluid device according to the present aspect, a dimension of the flow path in a second direction orthogonal to each of the flowing direction and the first direction is smaller than the dimension of the flow path in the first direction.

Accordingly, generation of the standing wave in the second direction can be prevented, and the standing wave in the first direction can be suitably generated.

The fluid device according to the present aspect further includes a pressure chamber spaced apart from the flow path in the first direction, and a communication path that is formed along the first direction and that communicates the pressure chamber with the flow path. The first ultrasonic wave transmitter is in contact with the fluid flowing into the pressure chamber and faces the first antinode region via the pressure chamber and the communication path.

In such a configuration, a part of the ultrasonic wave reflected by a wall surface of the flow path returns to the first ultrasonic wave transmitter via the communication path, but a remaining part of the ultrasonic wave is reflected again by the wall surface of the flow path. Therefore, it is possible to prevent the ultrasonic wave transmitted from the ultrasonic wave transmitter from being defeated by the ultrasonic wave reflected and returned from the flow path, increase a pressure in the pressure chamber, and add the acoustic power to the inside of the flow path. Accordingly, it is possible to easily generate a standing wave having a large acoustic power in the flow path.

What is claimed is:

1. A fluid device, comprising:
    a flow path through which a fluid flows;
    a first ultrasonic wave transmitter configured to transmit a first ultrasonic wave to generate a standing wave to the fluid in the flow path along a first direction orthogonal to a flowing direction of the fluid,
        wherein the first ultrasonic wave transmitter is in contact with the fluid and is disposed on a first region corresponding to a first antinode in the standing wave; and
    a second ultrasonic wave transmitter configured to transmit a second ultrasonic wave to generate the standing wave together with the first ultrasonic wave,
        wherein the first ultrasonic wave transmitter and the second ultrasonic wave transmitter are on a same side of the flow path.

2. The fluid device according to claim 1, wherein the second ultrasonic wave transmitter is in contact with the fluid and is disposed on a second region corresponding to a second antinode different from the first antinode in the standing wave.

3. The fluid device according to claim 2, wherein the first ultrasonic wave and the second ultrasonic wave have opposite phases.

4. The fluid device according to claim 2, wherein the first ultrasonic wave and the second ultrasonic wave have the same phase.

5. The fluid device according to claim 4, further comprising:
    a third ultrasonic wave transmitter configured to transmit a third ultrasonic wave to generate the standing wave together with the first ultrasonic wave transmitter and the second ultrasonic wave transmitter, wherein
        the third ultrasonic wave transmitter is in contact with the fluid and is disposed on a third region corresponding to a third antinode between the first antinode and the second antinode in the standing wave, and
        the third ultrasonic wave has an opposite phase from the first ultrasonic wave and the second ultrasonic wave.

6. The fluid device according to claim 1, wherein
    the first ultrasonic wave transmitter includes one or more ultrasonic elements, and
    each of the one or more ultrasonic elements includes
        a vibrator having a fluid contact surface that is in contact with the fluid, and
        a piezoelectric element that is provided at the vibrator and that is configured to generate flexural vibration to the vibrator in a normal direction of the fluid contact surface.

7. The fluid device according to claim 6, wherein the vibrator is disposed such that the normal direction of the fluid contact surface is along the first direction.

8. The fluid device according to claim 6, wherein $$t < \frac{C'}{C} \times \frac{L}{2n}$$

wherein a thickness of the vibrator is t, a sound velocity of a medium of the fluid is C, an average sound velocity of a longitudinal wave transmitted in the vibrator is C', a dimension of the flow path in the first direction is L, and a mode order of the standing wave is n.

9. The fluid device according to claim 1, wherein a dimension of the flow path in a second direction orthogonal to each of the flowing direction and the first direction is smaller than a dimension of the flow path in the first direction.

10. The fluid device according to claim 2, wherein a dimension of the flow path in a second direction orthogonal to each of the flowing direction and the first direction is smaller than a dimension of the flow path in the first direction.

11. The fluid device according to claim 3, wherein a dimension of the flow path in a second direction orthogonal to each of the flowing direction and the first direction is smaller than a dimension of the flow path in the first direction.

12. The fluid device according to claim 4, wherein a dimension of the flow path in a second direction orthogonal to each of the flowing direction and the first direction is smaller than a dimension of the flow path in the first direction.

13. The fluid device according to claim 5, wherein a dimension of the flow path in a second direction orthogonal to each of the flowing direction and the first direction is smaller than a dimension of the flow path in the first direction.

14. The fluid device according to claim 6, wherein a dimension of the flow path in a second direction orthogonal to each of the flowing direction and the first direction is smaller than a dimension of the flow path in the first direction.

15. The fluid device according to claim 7, wherein a dimension of the flow path in a second direction orthogonal to each of the flowing direction and the first direction is smaller than a dimension of the flow path in the first direction.

16. The fluid device according to claim 8, wherein a dimension of the flow path in a second direction orthogonal to each of the flowing direction and the first direction is smaller than the dimension of the flow path in the first direction.

17. The fluid device according to claim 1, further comprising:
- a pressure chamber spaced apart from the flow path in the first direction; and
- a communication path that is formed along the first direction and that communicates the pressure chamber with the flow path,
- wherein the first ultrasonic wave transmitter is in contact with the fluid flowing into the pressure chamber and faces the first region corresponding to the first antinode via the pressure chamber and the communication path.

* * * * *